US012348909B1

(12) United States Patent
Rognstad

(10) Patent No.: US 12,348,909 B1
(45) Date of Patent: Jul. 1, 2025

(54) HORTICULTURE TIME LAPSE CAMERA PHOTO AND SENSOR DATA CAPTURE SYSTEM CONFIGURED TO CAPTURE TIME-LAPSED PHOTOS AND CORRESPONDING TIME-LAPSE SERIES OF SENSOR DATA FOR USER ONSITE AND REMOTE TIMELINE PLAYBACK AND CONTROL

(71) Applicant: Christopher Paul Rognstad, San Jose, CA (US)

(72) Inventor: Christopher Paul Rognstad, San Jose, CA (US)

( * ) Notice: Subject to any disclaimer, the term of this patent is extended or adjusted under 35 U.S.C. 154(b) by 83 days.

(21) Appl. No.: 18/074,370

(22) Filed: Dec. 2, 2022

(51) Int. Cl.
| | |
|---|---|
| *A01G 31/02* | (2006.01) |
| *A01G 7/02* | (2006.01) |
| *A01G 7/04* | (2006.01) |
| *A01G 9/24* | (2006.01) |
| *A01G 25/16* | (2006.01) |
| *G06T 7/00* | (2017.01) |
| *H04N 7/18* | (2006.01) |

(52) U.S. Cl.
CPC ............... *H04N 7/183* (2013.01); *A01G 7/02* (2013.01); *A01G 7/045* (2013.01); *A01G 9/24* (2013.01); *A01G 25/167* (2013.01); *G06T 7/0012* (2013.01)

(58) Field of Classification Search
CPC .......... H04N 7/183; A01G 7/02; A01G 7/045; A01G 9/24; A01G 25/167; G06T 7/0012
See application file for complete search history.

(56) References Cited

U.S. PATENT DOCUMENTS

| | | | |
|---|---|---|---|
| 2016/0050360 A1* | 2/2016 | Fisher | H04N 23/64 348/207.11 |
| 2017/0097671 A1* | 4/2017 | Hutchison | G06F 1/324 |
| 2018/0077875 A1* | 3/2018 | Vander Velden | G06T 7/90 |

FOREIGN PATENT DOCUMENTS

| | | | | |
|---|---|---|---|---|
| CN | 111629168 A | * | 9/2020 | |
| WO | WO-2016164652 A1 | * | 10/2016 | A01G 31/00 |

* cited by examiner

*Primary Examiner* — Patrick E Demosky
(74) *Attorney, Agent, or Firm* — Plager Schack LLP; Mark H. Plager; Stephen Hallberg

(57) ABSTRACT

A horticulture time lapse camera photo and sensor data capture system is disclosed. The horticulture time lapse camera photo and sensor data capture system is configured to capture time-lapsed photos and corresponding time-lapse series of sensor data, combine the photos in a video sequence, generate sensor data charts and visualizations, synchronize the collected data points and sensor data charts and visualizations to a timeline associated with a playback time of the video sequence, and provide the time-sequenced video for a user to view with the corresponding time-sequenced data points and sensor data graphical objects via mobile app or website. The system takes all parameters and sensor measurements and converts them into charts and graphs for viewing along with time-synchronized video sequences of the time-lapse photography, thereby providing valuable information for a user to remotely monitor plants and control the growing environment.

15 Claims, 8 Drawing Sheets

HORTICULTURE TIME LAPSE CAMERA PHOTO AND SENSOR DATA CAPTURE SYSTEM CONFIGURED TO CAPTURE TIME-LAPSED PHOTOS AND CORRESPONDING TIME-LAPSE SERIES OF SENSOR DATA FOR USER ONSITE AND REMOTE TIMELINE PLAYBACK AND CONTROL

BACKGROUND

Embodiments of the invention described in this specification relate generally to gardening and plant growing systems, and more particularly, to a horticulture time lapse camera photo and sensor data capture system is configured for indoor or outdoor use and provides security, wireless communication, and environmental sensing automatically.

Indoor and outdoor gardens, planters, etc., often have automated systems, such as sprinklers and other automated devices that help to set better growing conditions for plants. However, the existing systems typically only provide a single automation aspect, such as providing water by automated sprinklers, or providing shade by an automated, moving cover, etc. As a result, many gardeners end up having to utilize multiple, separate devices.

For plants growing indoors, the area of growing is typically a small space or environment. Deploying many separate devices in a small space leads to an over-crowded environment which can have a significant negative impact on growing conditions. Furthermore, each device will introduce additional heat to the environment when operating. When multiple, separate devices are utilized, the amount of heat given off by the devices is significant. Yet, the area for growing plants may be small and have poor air circulation, which means that it would be difficult to keep excessive heat from impacting the plants. Also, many devices have indicators or power operation lights which impact light levels in the growing area. Some plants require more darkness than others for parts of the day. However, the greater the number of devices, the greater the number of lights being introduced in the growing environment. Another problem is the fact that many devices are powered via power cords that plug into wall outlets. Power cords laying all around the growing area is a hazard to some, as it becomes easy to trip over a cord.

Additionally, users growing plants often wonder what levels their grow environment is, especially when they are away from the growing area (e.g., on vacation, at work, etc.). Many users seek data related to similar things for gardening and growing, such as carbon dioxide ("$CO_2$") level, humidity level, temperature, soil moister level and content, soil acidity ("PH") level, amount of light and light level quality, security, etc.

Therefore, what is needed is a way to encompass several different plant growth assistive devices in a way that securely optimizes the growing conditions for plants in a growing area and which eliminates external device lighting or reduces the number of indicator lights, eliminates or reduces the number of power cords for the devices, and which is configured to provide remotely-accessible valuable grower information, such as carbon dioxide ($CO_2$), soil acidity (PH), humidity, temperature, soil moisture, etc., about the growing conditions over a span of time, along with corresponding video of the plants over the span of time, thereby allowing the user to be far more in tune with their plants in the growing environment than ever before and to be able to view such data remotely.

BRIEF DESCRIPTION

A novel horticulture time lapse camera photo and sensor data capture system is disclosed. In some embodiments, the horticulture time lapse camera photo and sensor data capture system is configured to capture time-lapsed photos and corresponding time-lapse series of sensor data, combine the photos in a video sequence, generate meaningful sensor data graphical objects from the captured sensor data, synchronize the collected data points and sensor data graphical objects to a timeline associated with a playback time of the video sequence, and provide the time-sequenced video for a user to view with the corresponding time-sequenced data points and sensor data graphical objects via mobile app or website. In some embodiments, the horticulture time lapse camera photo and sensor data capture system provides security, wireless communication, and automatic sensing of indoor or outdoor growing environments. In some embodiments, the horticulture time lapse camera photo and sensor data capture system takes all parameters and sensor measurements and convert them into charts and graphs for viewing along with time-synchronized video sequences to provide realtime information about the state of plants and let the user know when things are out of whack.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
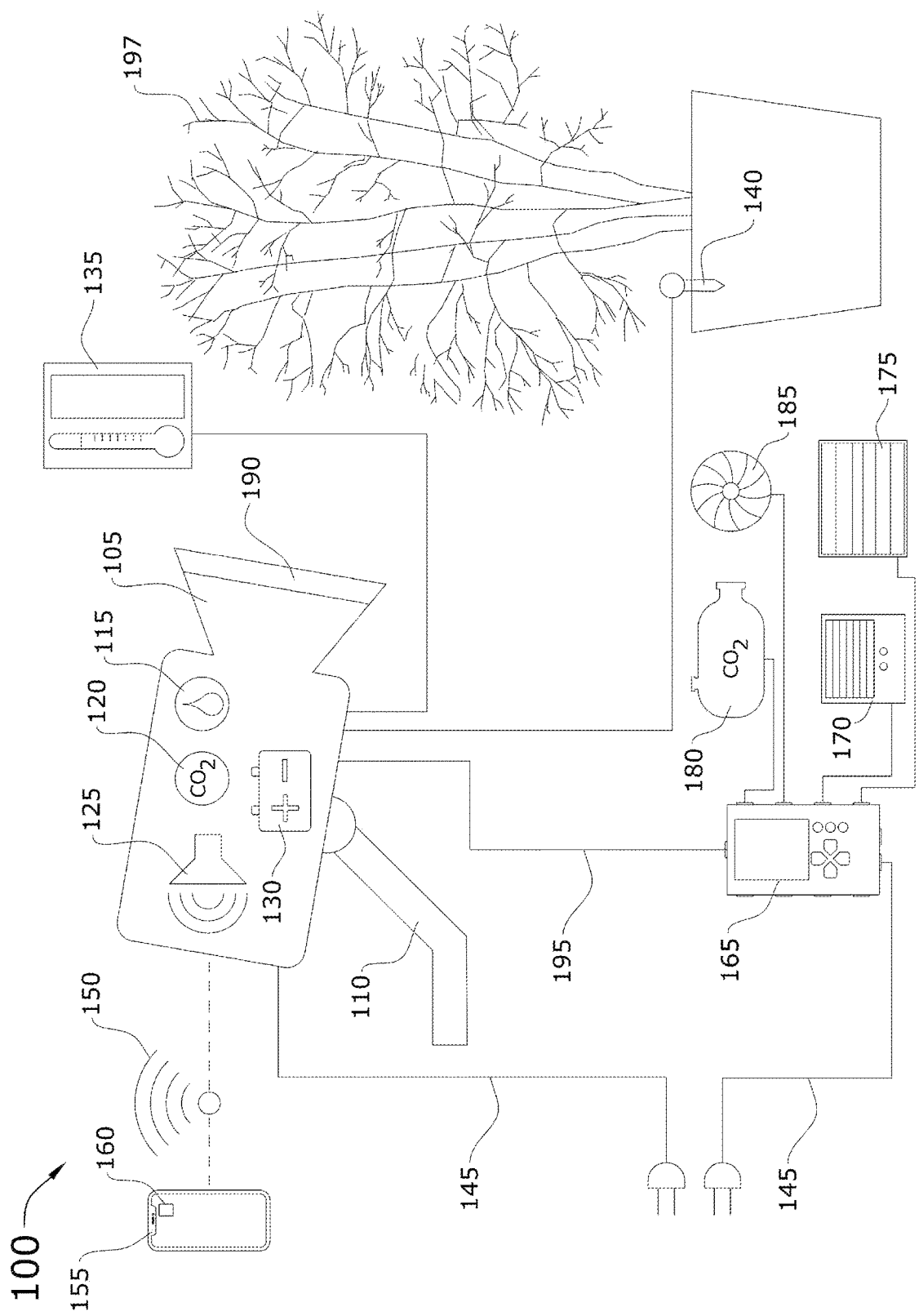
FIG. 1 conceptually illustrates a horticulture time lapse camera photo and sensor data capture system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a horticulture time lapse camera photo and sensor data capture system. In some embodiments, the horticulture time lapse camera photo and sensor data capture system is configured to capture time-lapsed photos and corresponding time-lapse series of sensor data, combine the photos in a video sequence, generate meaningful sensor data graphical objects (e.g., charts and data structures) from the captured sensor data, synchronize the collected data points and sensor data graphical objects to a timeline associated with a playback time of the video sequence, and provide the time-sequenced video for a user to view with the corresponding time-sequenced data points and sensor data graphical objects via mobile app or website. In some embodiments, the horticulture time lapse camera photo and sensor data capture system are configured for indoor or outdoor use and provides security, wireless communication (via WiFi, etc.), and environmental sensing automatically. In some embodiments, the horticulture time lapse camera photo and sensor data capture system takes all parameters and sensor measurements and convert them into charts and graphs for viewing along with time-synchronized video sequences to provide realtime information about the state of plants and let the user know when things are out of whack.

The horticulture time lapse camera photo and sensor data capture system of the present disclosure provides time-lapse video and information about growing conditions that impact plant growth, including, without limitation, carbon dioxide ($CO_2$), humidity, temperature, soil moister content, soil PH, light quality, amount of light, and security, among other data points. The horticulture time lapse camera photo and sensor data capture system of the present disclosure provides such information and data in a timeline synchronization with the time-lapse videos via wireless communication to mobile apps running on user devices (e.g., smartphones, tablet computing devices, other mobile smart devices, etc.) and via website (or more specifically, through a cloud application service) that visually outputs charts and graphics illustrating the data points over a timeline that corresponds to a time for playback of the video sequence of images captured by the time-lapse camera.

Embodiments of the horticulture time lapse camera photo and sensor data capture system described in this specification differ from and improve upon currently existing options by providing a complete system with a security time-lapse camera that is configured to automatically capture photos at specified intervals of time, environmental sensors and probes that are configured to capture conditions of the growing environment, and computing device and network device hardware with installed software configured to process the time-lapse images from the camera and the sensor data to generate a time-sequenced visual display of all data in conjunction with a video sequence of the captured images. No existing cameras relay all of this information to a user wirelessly to a website or mobile app. None of the existing options allows the user to visualize changes in the growing environment in the same manner as a time-sequenced combination of sensor data and time lapse video sequence.

The horticulture time lapse camera photo and sensor data capture system of the present disclosure generally works by using the time-lapse camera to capture images of the growing environment over time (e.g., from a start time to a finish time), combining the images in a video sequence, and time-synchronizing captured sensor data points to points of time associated with a timeline of the video sequence. In some embodiments, the time-lapse camera is a motion-sensitive security camera that is configured to capture surrounding objects and elements, and detect when an intruder is present or a growing condition has failed, broken, or otherwise presents a risk. While the time-lapse camera is not triggered by plant movement, a macro object movement may trigger the camera to capture an image, such as by animals and people. Furthermore, the time-lapse camera does not emit extraneous light into the growing environment because the camera lacks operational indicator lights. In some embodiments, the time-lapse camera provides indicator sound in lieu of indicator lights because light throws off dark time for plants. As such, the horticulture time lapse camera photo and sensor data capture system is able to take readings of the growing environment and give the user real-time reports on how well the controlled growing environment remains in the absence of the user. Since the user may be at a remote location, such as a far remote location or nearby remote location such as work, the user can view this data from a smart device app ("mobile app") and/or a website. The mobile app/website will visually output one or more video sequences with corresponding data points, charts, and other graphics that align to various timeline points, and inform the user of the status of environment conditions, such as carbon dioxide ($CO_2$), humidity, temperature, light, soil PH, soil moister, etc. All the data, images, and video sequences are stored locally and/or in a cloud database. In some embodiments, the mobile app is configured to connect to a calendar mobile app on the same mobile device.

To make the horticulture time lapse camera photo and sensor data capture system of the present disclosure, users would assemble or connect the devices, time-lapse camera, central power unit, WiFi, additional devices, sensors, probes, etc., in the growing environment of choice, and then configure and program the atmospheric conditions to allow the horticulture time lapse camera photo and sensor data capture system to function in a way that provides users with effective remote monitoring and control over a growing environment. That remote monitoring and control starts with capturing and creating time-lapse videos by a time-lapse camera, and measuring or detecting various atmospheric conditions. The videos are presented to users in realtime but can also be stored and retrieved for non-realtime viewing by users. For instance, users can access an integrated calendar to select a previous week or month, load the time-lapse video and associated atmospheric data for that time, and review as needed. In addition to passive viewing during playback, users are able to interact with the system via mobile application which provides tools for remote playback of the time-lapse videos with values of atmospheric conditions in the growing environment combined in time-synchronized way with the videos, so that the users can see which conditions may affect the plant(s) in the growing environment, as seen in the time-lapse video. Through such remote monitoring and control, the horticulture time lapse camera photo and sensor data capture system offers users peace of mind when they are away from their grow area.

In some embodiments, the horticulture time lapse camera photo and sensor data capture system automates monitoring and adjustment of atmospheric conditions within the growing environment the grow environment. Furthermore, users are able to configure and program ideal atmospheric conditions and set high and low thresholds for several aspects of the growing environment that can be measured or detected by sensors and probes. This allows users to travel to locations with peace of mind that remote monitoring and control is at their fingertips by interaction with a mobile application configured to connect to the horticulture time lapse camera photo and sensor data capture system. Furthermore, a central power unit provides a power distribution point for all devices, probes, and sensors of the horticulture time lapse camera photo and sensor data capture system, and is configured to track power output (wattage used), which the user can monitor remotely. Additionally, the central power unit in some embodiments is configured to manage data networking traffic-both receiving data from the probes and sensors and receiving time-lapse photography from the time-lapse camera, for transmission to a data storage, such as a local data storage or cloud database managed by a cloud application service.

To use the horticulture time lapse camera photo and sensor data capture system of the present disclosure, a user would turn on the time-lapse camera and configure it to connect to local WiFi. The user would also download the mobile app for remote connection to the horticulture time lapse camera photo and sensor data capture system. The time-lapse camera could be attached to a pole or to the wall. Other preparation and setup items include actions for setting up the sensors and probes. In particular, the user would stick the soil wired probes in the soil of the plant(s) being monitored via the horticulture time lapse camera photo and sensor data capture system. Yet it is not enough to just insert the probes into the soil since the wires of the soil probes would need to be connected to the time-lapse camera. In addition to the soil probes, the user would place, position, or hang the light sensor near the plant(s), so as to detect light levels. The user would also attach wiring between the light sensor and the time-lapse camera. In some embodiments, it would be suitable to deploy a wireless communication management device, with a wireless transmitter or transceiver (such as a Bluetooth transceiver), to which wiring from either or both of the soil probe and light sensor connect. Then, the wireless transmitter/transceiver could be configured to communicate wirelessly to the time-lapse camera and provide the probe and/or sensor data. In some embodiments, the time-lapse camera includes built-in $CO_2$, humidity, and temperature sensors. In some other embodiments, external sensors for detecting $CO_2$, humidity, and temperature are communicably connected to the time-lapse camera. In some embodiments, the temperature sensor is combined with the light sensor.

After all components of the horticulture time lapse camera photo and sensor data capture system are connected, the user would turn the time-lapse camera to an operational mode to start capturing time-lapse photos and receive period sensor and probe data. In this way, the horticulture time lapse camera photo and sensor data capture system will begin to log and capture photos, data, measurements, and readings. The horticulture time lapse camera photo and sensor data capture system will save the captured images in time-lapse photography, and save the sensor and probe data, measurements, and readings to a data storage, while also creating graphs, charts, and other visuals of the data, measurements, and readings. The horticulture time lapse camera photo and sensor data capture system would also time-synchronize the graphs, charts, and other visuals representing the sensor and probe data, measurements, and readings with the time-lapse photography. The resulting video sequence of time-lapse photography combined with the probe/sensor data graphs and charts would be prepared for playback, such that a viewer could play from start to finish, watch in near realtime, play at normal speed, fast forward to particular times of the timeline, or rewind to particular times along the timeline. The viewer would see the corresponding data, charts, and graphs associated with the timeline location of the video sequence for the time-lapse photography. The viewer can then take this information, and think about the changes they may have made in the grow environment that may have caused any negative or positive effects, and they can look back and physically see changes they may have caused. This allows gardeners, botanists, growers, and hobbyists a chance to see what is going on in a grow environment at specific times (or over a duration of time) and the effects on the plants.

By way of example, FIG. 1 conceptually illustrates a horticulture time lapse camera photo and sensor data capture system 100. As shown in this figure, the horticulture time lapse camera photo and sensor data capture system 100 combines and uses a plurality of components comprising a time-lapse camera 105, a camera mount 110, a humidity sensor 115, a carbon dioxide ($CO_2$) sensor 120, an audio speaker 125, a battery 130, a light and temperature sensor 135, a soil PH and moisture probe 140, a power cable 145, a wireless ("WiFi") signal 150, a mobile smart device 155, a mobile application ("mobile app") 160, a power control box with built-in regulator 165, a dehumidifier 170, an air conditioner 175, a $CO_2$ tank and dispenser 180, a heater fan 185, a focal ring of a camera lens 190, and a power and data cable 195. Additionally, the horticulture time lapse camera photo and sensor data capture system 100 shown in this figure is deployed to monitor and automatically adjust the grow environment around a plant 197.

In some embodiments, the time-lapse camera 105 is configured to capture time lapse photography. In addition, the time-lapse camera 105 of some embodiments is further configured to capture and record security videos. In some embodiments, the time-lapse camera 105 captures time lapse photography as a sequence of time-delayed images (or digital images as "time-lapse photography"). In some embodiments, the time-lapse camera 105 is configured to capture images and video at a minimum resolution of 1080i. However, the time-lapse camera 105 of the present disclosure is not limited to image/video resolution of 1080i. In fact, cameras with native resolutions of 1080p, 4K, and higher are also supported when deployed as the time-lapse camera 105 of the horticulture time lapse camera photo and sensor data capture system 100. Furthermore, lower resolution image/video capture can be configured by setting a resolution parameter of the time-lapse camera 105.

In some embodiments, the time-lapse camera 105 can focus manually or automatically on focal points in a field of view ("FoV") intended to be captured and recorded. Focusing of the time-lapse camera 105 is effectuated by manipulation of the focal ring of the camera lens 190. Specifically, the time-lapse camera 105 can be set for automatic focus or manual focus by way of a hardware interface dial, buttons, or other physically setting element (not shown in this figure), or by way of a software interface (not shown in this figure) accessible through a screen of the time-lapse camera 105. Then, when set for manual focusing, the user would manipulate the focal ring of the camera lens 190 by hand or by remote interaction through the mobile app 160 running on the mobile smart device 155. By contrast, when set for automatic focus, the time-lapse camera 105 itself would manipulate the focal ring of the camera lens 190 to focus automatically. Automatic focus is a preferred setting when a user will be away from the grow environment for a lengthy period of time (extending beyond mere hours to days or even weeks). Manual focus may be useful when the user intends to lock the focus to a particularly significant aspect of the grow environment, such that the time-lapse camera 105 would not re-focus automatically based on movement of things visible in the FoV (e.g., flies that periodically come into and fly out of the FoV, natural movements or growth of plants over a span of time, etc.). In some embodiments, the time-lapse camera 105 is configured for remote focal control through the mobile app 160. For example, the user may start the mobile app 160 and connect to the time-lapse camera 105 and, once connected, the user may interact with the mobile app 160 in ways that adjust the focus of the time-lapse camera 105, as visualized by the user through the mobile app 160.

In some embodiments, the power control box with built-in regulator 165 comprises a plurality of electrical outlets configured to provide electric power to a plurality of electronic devices. In some embodiments, the plurality of electrical outlets comprise dedicated outlets and non-dedicated outlets. An exemplary breakdown between the dedicated outlets and the non-dedicated outlets is described further below, by reference to FIG. 5.

In some embodiments, the power control box with built-in regulator 165 is at the heart of the horticulture time lapse camera photo and sensor data capture system 100. Therefore, all power cables for electrically powered components of the horticulture time lapse camera photo and sensor data capture system 100 are plugged into electrical outlets of the power control box with built-in regulator 165. As such, the power control box with built-in regulator 165 is able to turn the power of all components on and off. In some embodiments, the power control box with built-in regulator 165 provides surge protection that prevents breakers from tripping. In some embodiments, the power control box with built-in regulator 165 tracks wattage usage of each individual component of the horticulture time lapse camera photo and sensor data capture system 100. In some embodiments, the power control box with built-in regulator 165 has a built-in $CO_2$ regulator.

In some embodiments, the power control box with built-in regulator 165 also provides data networking and storage. For instance, an external data storage may connect to the power control box with built-in regulator 165 for storage of data received by the time-lapse camera 105 and/or any or all probes and sensors. Similarly, the power control box with built-in regulator 165 of some embodiments has built-in WiFi so that it can connect wirelessly to the WiFi signal 150 in order to upload such data to a cloud database. When connected to the WiFi signal 150, a user can interact with the mobile app 160 on the mobile smart device 155 to configure power settings for one or more (or all) power-connected components. Specifically, through the mobile app 160 on the mobile smart device 155, a timer can be set for lights in the grow environment. Based on this timer, the power control box with built-in regulator 165 will automatically turn the light(s) off and on at set times, or dim the light(s) based on the settings configured by the user. In some embodiments, the power control box with built-in regulator 165 dedicates one outlet exclusively to the light(s).

In some embodiments, a maximum temperature and a minimum temperature can be set through the mobile app 160 on the mobile smart device 155. The temperature can be set by usage of the heater fan 185 and/or the air conditioner 175. Although shown in this figure as components of the horticulture time lapse camera photo and sensor data capture system 100, the heater fan 185 and the air conditioner 175 are optional components. Therefore, it is up to the discretion of the user as to whether the heater fan 185 or the air conditioner 175 are required. In practical usage, the user may find it advantageous to have either one or the other, but often will not deploy both the heater fan 185 and the air conditioner 175 at the same time. For example, when the outside weather is warmer, an air condition is more likely to be needed and when the outsider whether is cold, like in winter, the heater is the more likely choice. Accordingly, a single outlet of the power control box with built-in regulator 165 is typically going to be dedicated exclusively to temperature control. Additionally, instead of the heater fan 185, the user may power a heating pad as an alternative heating (temperature) control component. Nevertheless, the power control box with built-in regulator 165 must supply sufficient electric power to these temperature controlling components, especially for the air conditioner 175.

Another component that is powered by the power control box with built-in regulator 165 and can be configured through the mobile app 160 on the mobile smart device 155 is the $CO_2$ tank and dispenser 180. The $CO_2$ tank and dispenser 180 plugs into a dedicated outlet of the power control box with built-in regulator 165 exclusively intended for the $CO_2$ tank and dispenser 180. When plugged into an outlet of the power control box with built-in regulator 165, the level of $CO_2$ dispensed by the $CO_2$ tank and dispenser 180 can be automated and controlled by the power control box with built-in regulator 165 according to settings configured and set by the user through the mobile app 160.

While the descriptions of the power control box with built-in regulator 165 above demonstrate key aspects of how the horticulture time lapse camera photo and sensor data capture system 100 works, more detailed descriptions of the power control box with built-in regulator 165 are described below, by reference to FIGS. 5 and 6.

Continuing the description of FIG. 1, in some embodiments, humidity level can be set through the mobile app 160 on the mobile smart device 155. Specifically, the user may set the humidity to desired levels which automatically triggers operation of the dehumidifier 170. The dehumidifier 170 is plugged into the power control box with built-in regulator 165 at an outlet exclusively dedicated to the dehumidifier 170. Alternatively, a humidifier could be deployed as a component of the horticulture time lapse camera photo and sensor data capture system 100 and plugged into this dedicated power outlet of the power control box with built-in regulator 165. The choice of the dehumidifier 170 or the humidifier would likely depend on local climate factors and plant needs in the growing environment.

In some embodiments, the power control box with built-in regulator 165 of the horticulture time lapse camera photo and sensor data capture system 100 comprises at least four non-assigned outlets in the plurality of outlets to plug in other devices. Examples of other devices that may be powered for usage by the horticulture time lapse camera photo and sensor data capture system 100 include, without limitation, oscillating fans, inline fans, watering devices, etc. These non-assigned outlets will have a timer and frequency control via the mobile app 160 on the mobile smart device 155. The idea is that if all electronic components are plugged into the power control box with built-in regulator 165, wattage usage can be tracked and relayed in real-time to the mobile app 160 on the mobile smart device 155, saved in the cloud database (or local external persistent data storage device, such as a hard drive of a computing device) in the form of raw data, as well as charts, graphs, numbers, and timeline. In this way, when the user is viewing through time lapse mode, they will see the atmospheric values change during playback of the time lapse video. Wherever they stop the video, they can view the various data points for all connected devices. This will show the user what's going on, how, and why the plants are looking the way they are and reacting to any changes that have been made. Additionally, the power control box with built-in regulator 165 need not connect to the cloud database to work. For instance, in some embodiments, the power control box with built-in regulator 165 includes a data port (such as a USB port or an HDMI power) that connects to an external hard drive that is configured to store all data, images (time-lapse photography). This is an option for users who cannot or do not want to use the cloud but still wish to store large amounts of information and/or want to connect a PC to the horticulture time lapse camera photo and sensor data capture system 100.

In some embodiments, the power control box with built-in regulator 165 provides 14 amp electric power. However, the power control box with built-in regulator 165 needs to be powerful enough to support a small air conditioning (AC) unit without tripping a power breaker. Therefore, the power control box with built-in regulator 165 of some embodiments provides 19 amp electric power. In some embodiments, the power control box with built-in regulator 165 also needs to be strong enough to be able to dim the lights to create sunrise and sunsets based on the program the operator has set. For sufficient power under those circumstances, for example, it may be sensible to deploy the power control box with built-in regulator 165 which provides 19 amp electric power.

In some embodiments, the power plug 145 connects to a wall outlet to provide operational power to the time-lapse camera 105, the power control box with built-in regulator 165, or both. For instance, the time-lapse camera 105 may connect (via power plug 145) to a wall outlet instead of obtaining power from the power control box with built-in regulator 165. Alternatively, or in conjunction with the power plug 145, the power and data cable 195 connects the time-lapse camera 105 to the power control box with built-in regulator 165. In some embodiments, the power and data cable 195 is a USB cable configured to transmit electrical power to the time-lapse camera 105 and transmit data (including digital video and time-lapse photography data) from the time-lapse camera 105 to the power control box with built-in regulator 165, which can then be stored locally in a persistent data storage unit and/or uploaded to a cloud database configured to receive, process, store, organize, and present such data. In some other embodiments, the battery 130 is a rechargeable battery 130 that provides power to operate the time-lapse camera 105 in the event of power loss. In this way, the battery 130 is a back-up power source that ensures that basic information will be recorded until power via the power plug 145 or power and data cable 195 can be restored (or until the battery 130 itself loses all charge). In some embodiments, the battery 130 can be removed from the camera for charging. In some embodiments, the battery 130 can also be charged via the power and data cable 195 connected to the power control box with built-in regulator 165 while the battery 130 is mounted into a battery slot of the time-lapse camera 105.

In some embodiments, the time-lapse camera 105 is mounted to the camera mount 110 and houses the humidity sensor 115, the carbon dioxide ($CO_2$) sensor 120, the audio speaker 125, and the battery 130. In some embodiments, the camera mount 110 attaches to a wall nearby the grow environment monitored by the horticulture time lapse camera photo and sensor data capture system 100. In some other embodiments, the camera mount 110 is vertical pole, beam, tent post, or other rigid vertical support.

In addition to the components housed by the time-lapse camera 105, external components of the horticulture time lapse camera photo and sensor data capture system 100 may be directly or indirectly connected to the time-lapse camera 105. In some embodiments, the light and temperature sensor 135 and the soil PH and moisture probe 140 are directly connected to the time-lapse camera 105 via wired data connection. However, the light and temperature sensor 135 and/or the soil PH and moisture probe 140 may alternatively by indirectly connected to the time-lapse camera 105 by way of direct connection to the power control box with built-in regulator 165 and then to the camera 105 over the power and data cable 195. Also, the dehumidifier 170, the air conditioner 175, the $CO_2$ tank and dispenser 180, and the heater fan 185 are all indirectly connected to the time-lapse camera 105 by way of direct connection to the power control box with built-in regulator 165 and thereafter by data communication connection over power and data cable 195. As another alternative, the light and temperature sensor 135, the soil PH and moisture probe 140, the dehumidifier 170, the air conditioner 175, the $CO_2$ tank and dispenser 180, and the heater fan 185 may all connect directly to the power control box with built-in regulator 165 for electric power, as needed, while communicably connecting over a wireless connection (such as via Bluetooth or WiFi) to the time-lapse camera 105. In some embodiments, a $CO_2$ tube (not shown in this figure) connects between the $CO_2$ tank and dispenser 180 and an oscillating fan to disburse $CO_2$ into the growing environment.

In some embodiments, the light and temperature sensor 135 combines and integrates two sensors: one for light detection, the other for temperature detection. In contrast to a combined device, the light and temperature sensor 135 comprises two physically separate sensors (despite being shown in this figure as combined). For purposes of the ensuing description, the light sensor and the temperature sensor may be referred to as "the light sensor 135" and "the temperature sensor 135", or "the light and temperature sensor 135". Also, the light sensor 135 (with or without the temperature sensor) may house the $CO_2$ sensor 120 instead of having the $CO_2$ sensor 120 housed in the time-lapse camera 105 itself.

In some embodiments, the light and temperature sensor 135 is hung on a wall by a hook or connected to the wall or the camera mount 110 by hook and loop fasteners or double-sided adhesive tape. Also, the light and temperature sensor 135 may hang or attach upside-down, right-side up, horizontal, angled, dangle over a canopy, or otherwise orient in manner that allows the light sensor to detect ambient light in the growing environment. In some embodiments, the light and temperature sensor 135 connects by wire to the time-lapse camera 105 for transmission of sensor data to the camera 105 and (optionally) to power the sensor 135 from the camera 105. In some other embodiments, the light and temperature sensor 135 connects by power cable to the power control box with built-in regulator 165 for its power needs. In some embodiments, the light sensor 135 triggers the time-lapse camera 105 to disable indicator lights and infrared (IR) light(s) that may be emitting outward from the camera 105 when the light sensor 135 detects no ambient (other) light in the growing environment. In this way, the light sensor 135 is able to prevent light from the camera 105 from polluting the growing environment, which some plants may need for a certain duration of time per day.

In some embodiments, the soil PH and moisture probe 140 is formed in a double pronged fork configuration in which a first probe penetrates the soil to detect soil PH ("soil PH probe") and a second probe also penetrates the soil to detect soil moisture ("soil moisture probe"). For physical wiring to the time-lapse camera 105 or the power control box with built-in regulator 165, a first wire for the soil PH probe and another second wire for the soil moisture probe are connected to the camera 105 or the power control box with built-in regulator 165.

In some embodiments, the time-lapse camera 105 comprises additional devices, sensors, and components. While not shown in this figure, the additional devices, sensors, and/or components add enhanced capabilities to the time-lapse camera 105. For instance, the time-lapse camera 105 may house a wireless communication chip, such as a WiFi transceiver for wireless communication between the time-lapse camera 105 and the WiFi signal 150. Similarly, the time-lapse camera 105 may provide a slot to connect a universal serial bus ("USB") cable which can be used to power the time-lapse camera 105, charge the battery 130, or transmit data to an external storage or cloud database. Furthermore, the time-lapse camera 105 may include a slot to connect a high-definition media interface ("HDMI") cable, and one or more slots for memory cards/devices, such as a memory card. In some embodiments, the memory card provides an option for data storage beyond the cloud database as the memory card is configured to store data when installed directly in the memory card slot of the time-lapse camera 105. In this way, the user may store data, videos, time lapse photography, and other data (such as atmospheric values and wattage usage) without connected to the cloud database or connecting an external data storage device to the power control box with built-in regulator 165.

The description above provides a fundamental understanding of the horticulture time lapse camera photo and sensor data capture system 100. In addition, the next example, described by reference to FIG. 2, builds on this by providing details of a process for using the horticulture time lapse camera photo and sensor data capture system.

Figure 2:
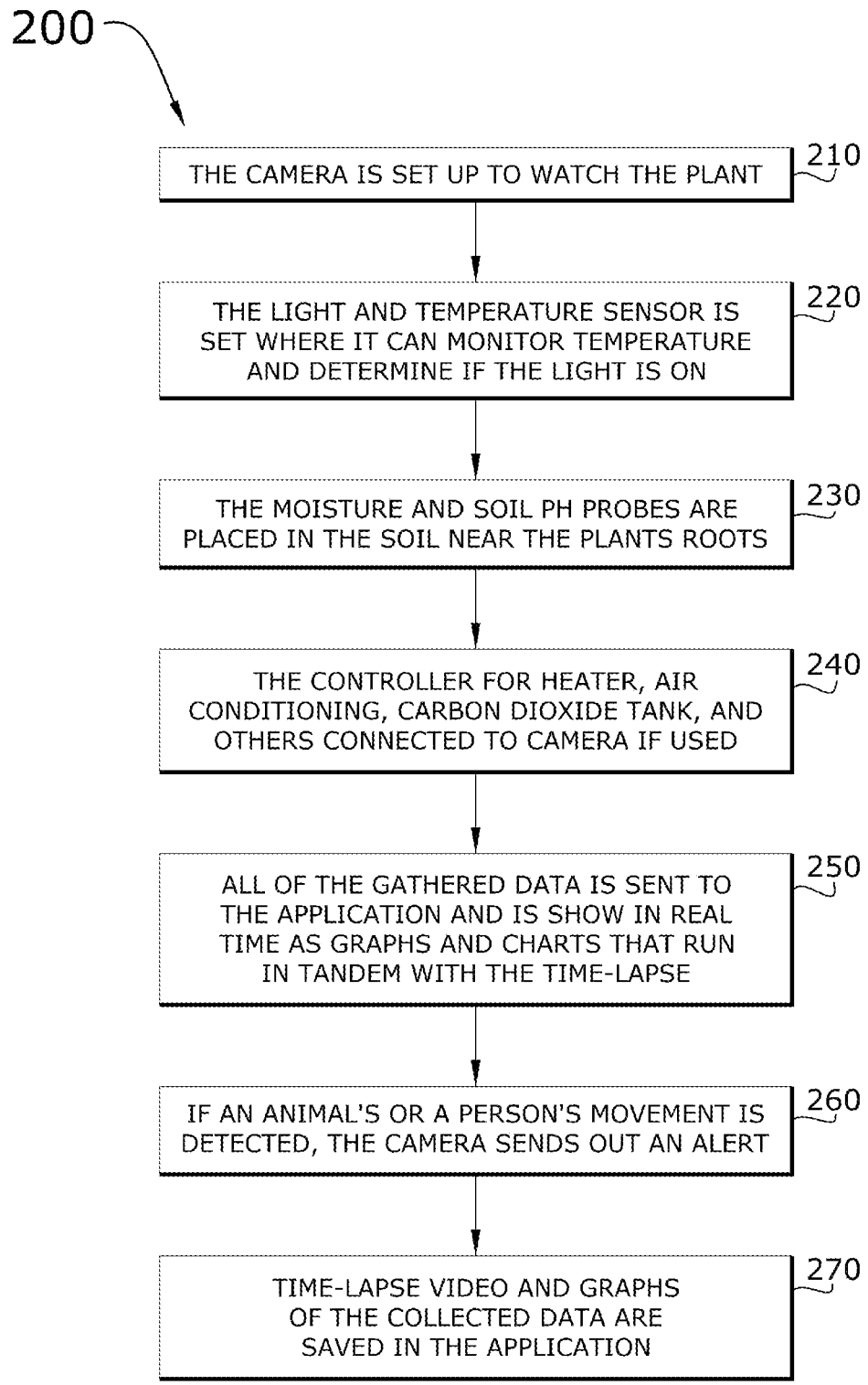
FIG. 2 conceptually illustrates a process for using the horticulture time lapse camera photo and sensor data capture system in some embodiments.

Specifically, FIG. 2 conceptually illustrates a process for using the horticulture time lapse camera photo and sensor data capture system 200. As shown in this figure, the process for using the horticulture time lapse camera photo and sensor data capture system 200 starts with the time-lapse camera being set up to watch or monitor a plant (at 210). The plant may be multiple plants in a growing environment. Certain notable aspects of the plant or plants require care by the user to set this growing environment right. In this way, the process for using the horticulture time lapse camera photo and sensor data capture system 200 involves setting up a light and temperature sensor to measure light (ambient room light) that is directly or indirectly within view of the plant or plants (at 220). Another aspect of concern for the user is getting the moisture and PH level correct, depending on the type of plant. Specifically, the process for using the horticulture time lapse camera photo and sensor data capture system 200 includes inserting probes for the soil moisture and the soil PH (at 230). The soil moisture probe is for checking the amount of moisture available to the plant while the soil PH probe measures the soil acidity level, since different plants prosper, flail, or die in various different levels of soil PH. As a double-prong probe device, the soil moisture probe and the soil PH probe are each placed in the soil near the roots of the plant.

In some embodiments, the next step in the process for using the horticulture time lapse camera photo and sensor data capture system 200 involves connecting certain external devices to the time-lapse camera (at 240), specifically, the controller for the heater, air conditioning, carbon dioxide tank, and others (if used). Next, all of the gathered data is sent to the mobile app (at 250) and shown in realtime as time-lapse photography, graphs, charts, etc. In some embodiments, the next step in the process for using the horticulture time lapse camera photo and sensor data capture system 200 involves detecting motion or movement in the environment and sending out an alert (by the time-lapse camera) when so detected (at 160). Finally, the process for using the horticulture time lapse camera photo and sensor data capture system 200 proceeds to a step at which time-lapse video (or time-lapse photography), sensor and environment data (including graphs, charts, and other visuals), and any other collected or captured data are saved and stored in the cloud database and then published through the cloud application service for visualization in the mobile app or website (at 270). Then the process for using the horticulture time lapse camera photo and sensor data capture system 200 may continue by repeating operational steps from 250 through 270.

Figure 3:
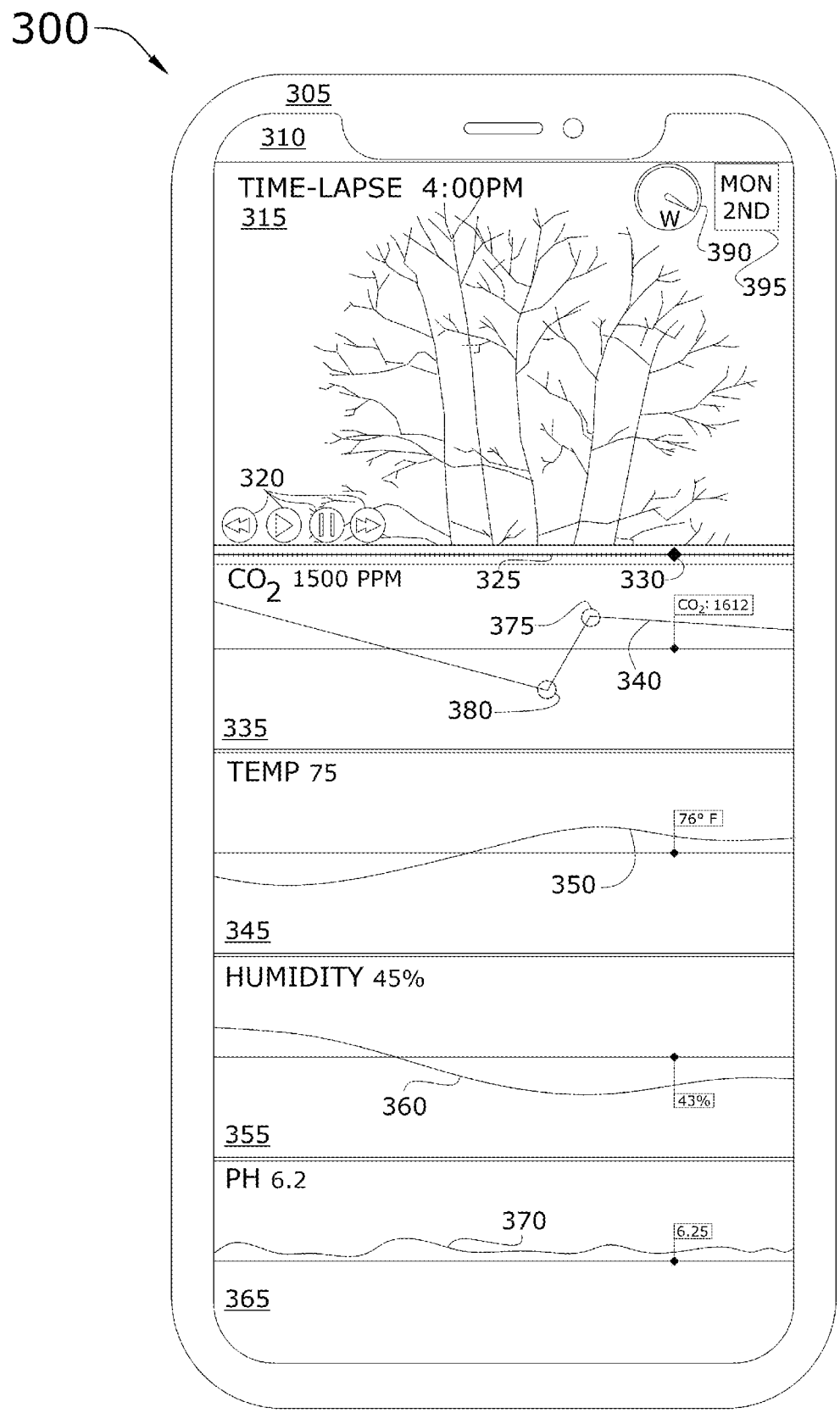
FIG. 3 conceptually illustrates a mobile device displaying a first configured view for a horticulture time lapse user interface of a mobile app used in connection with the horticulture time lapse camera photo and sensor data capture system in some embodiments.

By way of example, FIG. 3 conceptually illustrates a mobile smart device displaying a first configured view for a horticulture time lapse user interface of a mobile app used in connection with the horticulture time lapse camera photo and sensor data capture system 300. As shown in this figure, the mobile smart device 305 displays a horticulture time lapse user interface 310 in a first viewing configuration selected by a user interacting with the mobile app. The horticulture time lapse user interface 310 shown in this figure demonstrates playback of a time-lapse photography video 315 (time lapse mode) and provides a set of playback tools 320, a timeline 325, a timeline playback tool 330, a plurality of sensor and probe data views with corresponding time-sequenced sensor and probe charts including a carbon dioxide ($CO_2$) view 335 with a time-sequenced $CO_2$ sensor chart 340, a temperature view 345 with a time-sequenced temperature chart 350, a humidity view 355 with a time-sequenced humidity level sensor chart 360, and a soil PH view 365 with a time-sequenced soil PH probe chart 370. Also shown in the horticulture time lapse user interface 310 is a high $CO_2$ setting 375, a low $CO_2$ setting 380, a week-long dial 390, and a day selection tool 395.

The mobile app is configured to present realtime playback of a growing environment (realtime mode), video playback of the growing environment (video mode), time lapse playback of a time-lapse photography video (time lapse mode), and charts and graphs data playback (charts and graphs mode). In some embodiments, the charts and graphs data playback can be toggled on/off and can be combined with the realtime mode, the video mode, or the time lapse mode, thereby giving the user complete viewing control of the growing environment and providing more information than ever before, with the ability to correct and change atmospheric levels remotely.

Figure 4:
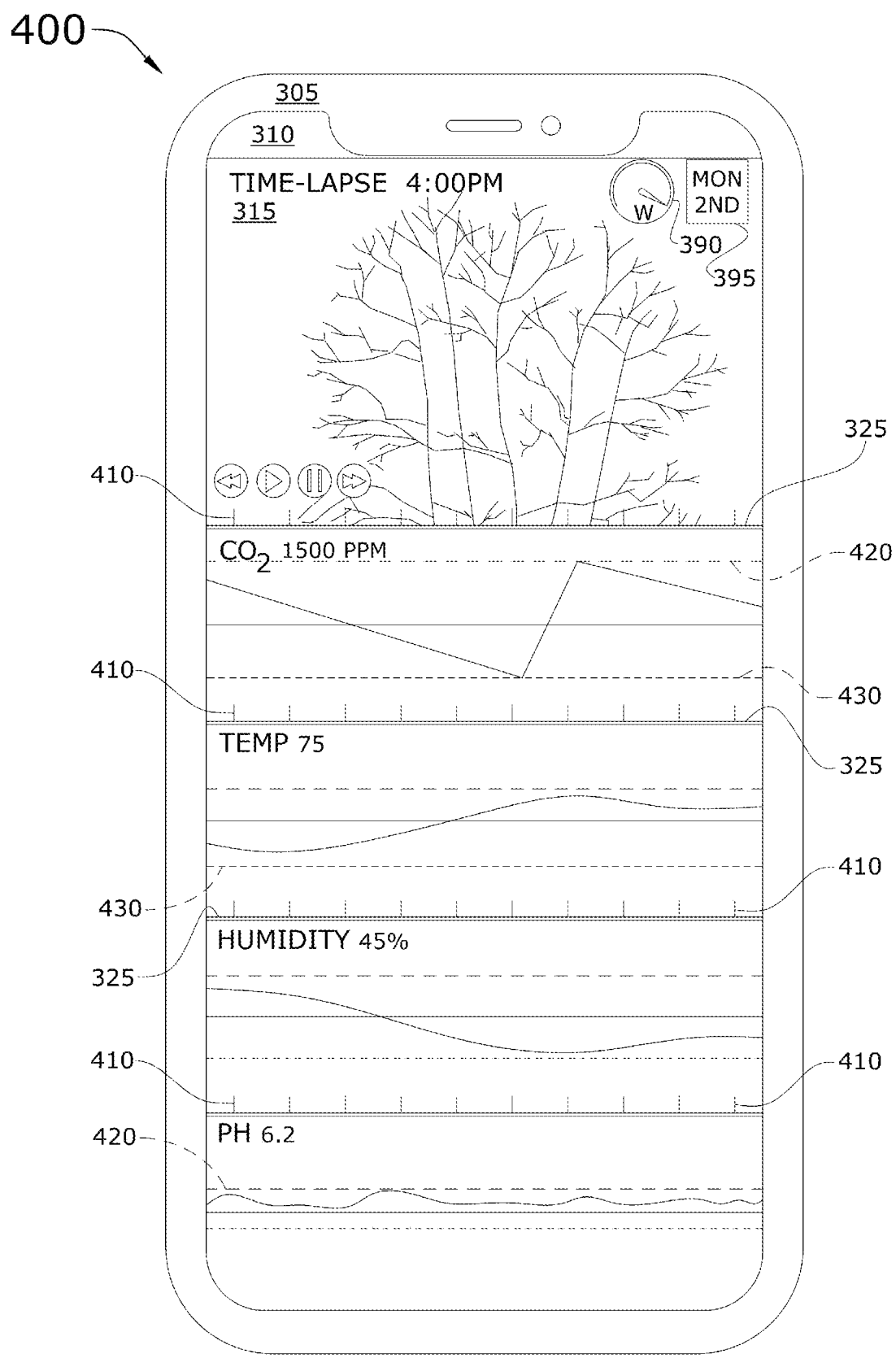
FIG. 4 conceptually illustrates a mobile device displaying a second configured view of a horticulture time lapse user interface of a mobile app used in connection with the horticulture time lapse camera photo and sensor data capture system in some embodiments.

The mobile app provides the user, via the horticulture time lapse user interface 310, with a control interface that enables complete (remote) control over the growing environment. The horticulture time lapse user interface 310 shown in this figure demonstrates a first view configuration. However, other view configurations are possible and provide the same or similar control over the grow environment. In some embodiments, the mobile app allows the user to change or re-configure the horticulture time lapse user interface 310 in different ways that the user finds suitable. For instance, the horticulture time lapse user interface 310 shown in this figure demonstrates a first view configuration that provides a single timeline 325 during playback of a time lapse video captured over an amount of time (or "duration") by the system and sensor-detected growing environment data over the duration. A different view configuration (or "second configured view") of the horticulture time lapse user interface is described below, by reference to FIG. 4, and provides several timelines with time markers displayed at intervals over the duration of the time lapse video captured by the camera and data captured by the sensors.

Referring back to FIG. 3, the horticulture time lapse user interface 310 shown in this figure demonstrates playback of a time-lapse photography video 315 (time lapse mode) and provides the set of playback tools 320 for such user control, whether the user is local (at site of the grow environment) or remote. Also, the timeline 325, shown in this first view configuration of the horticulture time lapse user interface 310, tracks playback time of the time-lapse photography video. The timeline playback tool 330 provides the user the requisite control over playback, being configured for user manipulation to change a timeline view of the time-lapse photograph video 315. For example, pull the timeline playback tool 330 back along the timeline 325 to replay the video 315 from an earlier point in the duration or move the timeline playback tool 330 forward along the timeline 325 to fast-forward to a later point in the duration of the video 315. In this way, the user is able to review any problems in the setup of the grow environment or other anomalies and make changes to their growing environment remotely. Furthermore, the user is able to receive realtime data, alerts, and security feeds, which provide the user with certainty, security, and control over their growing environment.

Through the mobile app, when setting up the growing environment, the user can set high and low levels for each atmospheric value. Accordingly, the high and low levels for each atmospheric value as set by the user will be automatically monitored and kept in check by the system. In this figure, examples of some high and low settings are shown by encircled points of a corresponding graph-specifically showing when the high $CO_2$ setting 375 is detected in the grow environment and when the low $CO_2$ setting 380 is detected in the grow environment. Of course, high and/or low levels may not be detected for any given atmospheric value during the time lapse duration, and would not be demonstrated or indicated in the first view configuration. However, in other view configurations of the horticulture time lapse user interface, such as the second view configuration described below by reference to FIG. 4, the high and low levels are demonstrated by transverse lines or dashed lines, like the horizontally positioned timeline 325 shown in this figure. In this way, the user can always get a visual sense of how close to the high or low level the grow environment is for any particular atmospheric value.

Also shown in the horticulture time lapse user interface 310 are a plurality of sensor and probe data views with corresponding time-sequenced sensor and probe charts. Specifically, the horticulture time lapse user interface 310 shows a carbon dioxide ($CO_2$) view 335 with a time-sequenced $CO_2$ sensor chart 340, a temperature view 345 with a time-sequenced temperature chart 350, a humidity view 355 with a time-sequenced humidity level sensor chart 360, and a soil PH view 365 with a time-sequenced soil PH probe chart 370. Also shown in this figure is a high $CO_2$ setting 375 and a low $CO_2$ setting 380. When the low $CO_2$ setting 380 was detected by the $CO_2$ sensor, the $CO_2$ tank and dispenser 180 was automatically triggered by the horticulture time lapse camera photo and sensor data capture system 100 to disburse more carbon dioxide into with the growing environment. The disbursement of carbon dioxide continued until the high $CO_2$ setting 375 was detected by the $CO_2$ sensor. That is, once the high $CO_2$ setting 375 was detected, the $CO_2$ tank and dispenser 180 was triggered to automatically stop the disbursement of carbon dioxide. High and low settings are configurable by the user through a parameter settings view of the mobile app. Thus, high and low settings for temperature, humidity level, and soil PH level, while not shown in this figure, may have also been set.

In some embodiments, the user is able to start playback, pause playback, fast forward through playback, and fast rewind through playback of the time-lapse photography video 315 by selection of the corresponding tool in the set of playback tools 320. Furthermore, in some embodiments, the user is able to interact by selecting and moving the timeline playback tool 330. In other view configures, the user may be able to move to different points in the timeline by selecting one or more timeline markers. Moving the timeline playback tool 330 along the timeline 325 would cause the time-lapse photography video 315 to scroll back to or forward to the timeline position of the timeline 325 at which the user moves the timeline playback tool 330. Consequently, wherever the user scrolls the timeline playback tool 330 along the timeline 325, data values for each sensor/probe is displayed for the sensor or probe reading corresponding to that timeline 325 position. In this example, carbon dioxide was detected to be 1612 PPM (which was slightly higher than the ideal setting of 1500 PPM), temperature was measured to be seventy-six degrees Fahrenheit (which was slightly higher than the ideal setting of seventy-five degrees), humidity level was forty-three percent (which was slightly lower than the ideal setting for humidity of forty-five percent), and soil PH was measured to be 6.25 (which was barely higher than the ideal PH level of 6.2).

In some embodiments, the mobile app comprises a calendar system that is connected to all of the devices, sensors, and probes of the horticulture time lapse camera photo and sensor data capture system 100 which are connected to the power control box with built-in regulator 165. The calendar system can be a built-in, integrated calendar of the horticulture time lapse camera photo and sensor data capture system or an external calendar system, such as a calendar tool or calendar cloud application service provided by a third party. Whether the calendar system is built-in as an integrated component of the horticulture time lapse camera photo and sensor data capture system, or linked (if external calendar) to the horticulture time lapse camera photo and sensor data capture system, the user is able to plan and program a schedule through the calendar. Also, some other tools in the horticulture time lapse user interface 310 enable the user to easily access the calendar and select timelines of interest. For instance, a week-long dial 390 enables a user to move the dial hand to go back and forth between the seven days of a preceding week. Similarly, a day selection tool 395 is user selectable to bring up a month calendar from which the user may select any given day to display corresponding time-lapse photography video 315 for that day. In some embodiments, the week-long dial 390 and the day selection tool 395 are connected to a separate calendar app installed on the mobile smart device 305 or accessed over the Internet, via a cloud calendar application service. In other view configurations, other calendar tools may be presented for user selection to provide the user with other kinds calendaring control and video playback/sensor data review of the various aspects of their growing environment.

Additionally, while not shown in this first view configuration, the horticulture time lapse user interface 310 of some embodiments incorporates a vertical scroll bar which is user selectable to scroll up and down through various other sensor and probe views and chart data that are time-sequenced according to the time-lapse photography video 315 via the timeline 325. In some embodiments, the horticulture time lapse user interface 310 is configured for direct parameter setting by click or touch selection. Specifically, the user will be able to click on each sensor and probe data view or any atmospheric value in those sensor and probe data views and set desired maximum and minimum levels for that atmospheric sensor or probe. Furthermore, while not shown in this figure, the horticulture time lapse user interface 310 of some embodiments incorporates a horizontal scroll bar which enables the user to scroll left and right along an expanded timeline which does not fit on the screen of the mobile smart device 305. Thus, if the user scrolls left or right, indicating locations beyond a present visible screen, the timeline 325 on the atmospheric values and the time-lapse photography video 315 will change along with the timeline 325.

As noted above, the first view configuration of the horticulture time lapse user interface 310 is a single example of a configuration that may be suitable for the user, yet other view configurations are possible for the user to set in the mobile app. By way of example, FIG. 4 conceptually illustrates the mobile device 305 displaying a second configured view (or "second view configuration") of the horticulture time lapse user interface 310. As shown in this figure, the second view configuration of the horticulture time lapse user interface 310 includes a plurality of timelines 325 shown for the time-lapse video and all the atmospheric sensor graphs displayed in the horticulture time lapse user interface 310. Also, each timeline 325 includes a plurality of user-selectable time markers 410. Additionally, transverse (horizontal) peak/high lines 420 and trough/low lines 430 are visually output for each graph, thereby giving the user a visual sense of how each atmospheric condition in the grow environment is over time and also how effectively the horticulture time lapse camera photo and sensor data capture system responds to atmospheric conditions that meet or exceed the peak/high lines 420 and/or trough/low lines 430.

Figure 5:
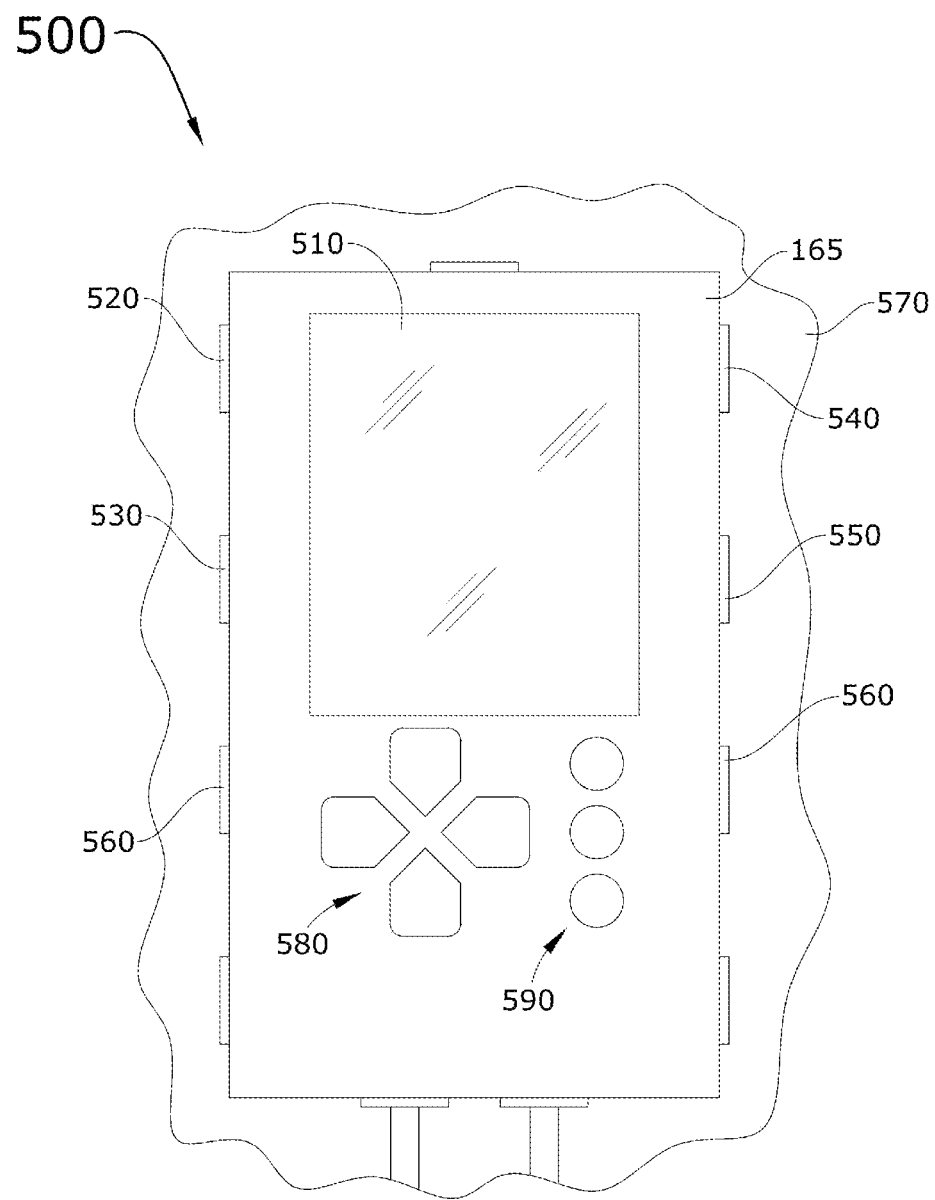
FIG. 5 conceptually illustrates a detailed front view of the power control box with built-in regulator of the horticulture time lapse camera photo and sensor data capture system in some embodiments.

Referring now to FIG. 5, a detailed front view 500 of the power control box with built-in regulator 165 is conceptually illustrated. Specifically, the power control box with built-in regulator 165 is attached to a wall 570 of the grow environment (or another flat surface in the grow environment). The power control box with built-in regulator 165 show in this figure includes a power control box display 510, a first dedicated outlet 520, a second dedicated outlet 530, a third dedicated outlet 540, a fourth dedicated outlet 550, additional outlets 560, a plurality of directional buttons 580 for navigation of the view displayed on the power control box display 510, and a plurality of selection and settings buttons 590.

Figure 6:
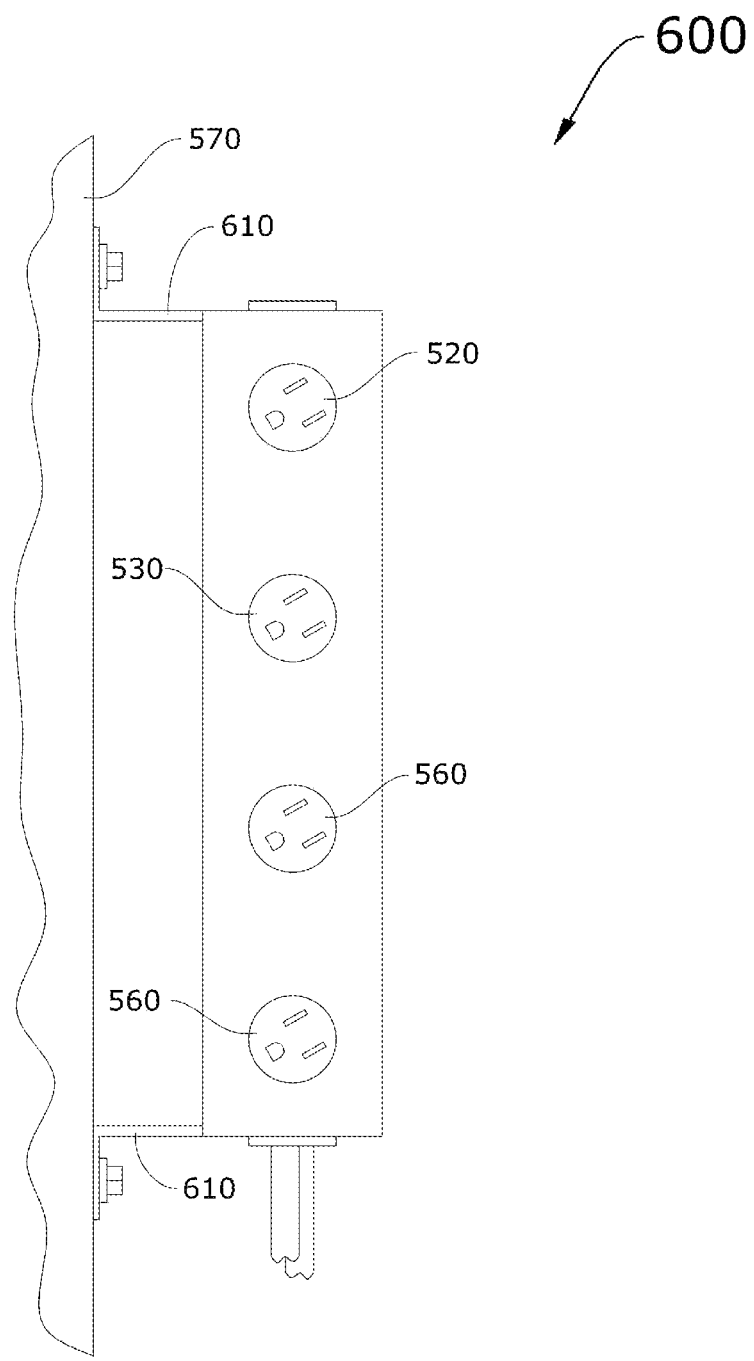
FIG. 6 conceptually illustrates a detailed side view of the power control box with built-in regulator of the horticulture time lapse camera photo and sensor data capture system in some embodiments.

From another perspective, FIG. 6 conceptually illustrates a detailed side view 600 of the power control box with built-in regulator 135 of the horticulture time lapse camera photo and sensor data capture system in some embodiments. As shown in this figure, the first dedicated outlet 520, the second dedicated outlet 530, and two additional outlets 560 are aligned along the left side of the power control box with built-in regulator 135 when mounted to the wall 570 (and with the power control box display 510, not shown in this figure, facing out). Also shown in this figure are box wall brackets 610 that are used to mount the power control box with built-in regulator 135 to the wall 570.

While the examples above are presented in a particular view configuration or order or other setting, a person of ordinary skill in the relevant art would appreciate that many different designs are possible. In particular, features from the first and second view configurations, described above by reference to FIGS. 3 and 4, can be individually turned on and off in settings the user may access in a settings view (not shown). In addition, by accessing the settings view, the user can turn on any combination of the features shown, or other features that visually assist the user in understanding the state of their grow environment. An example of combining different features from the first and second view configurations is described next, by reference to FIG. 7.

Figure 7:
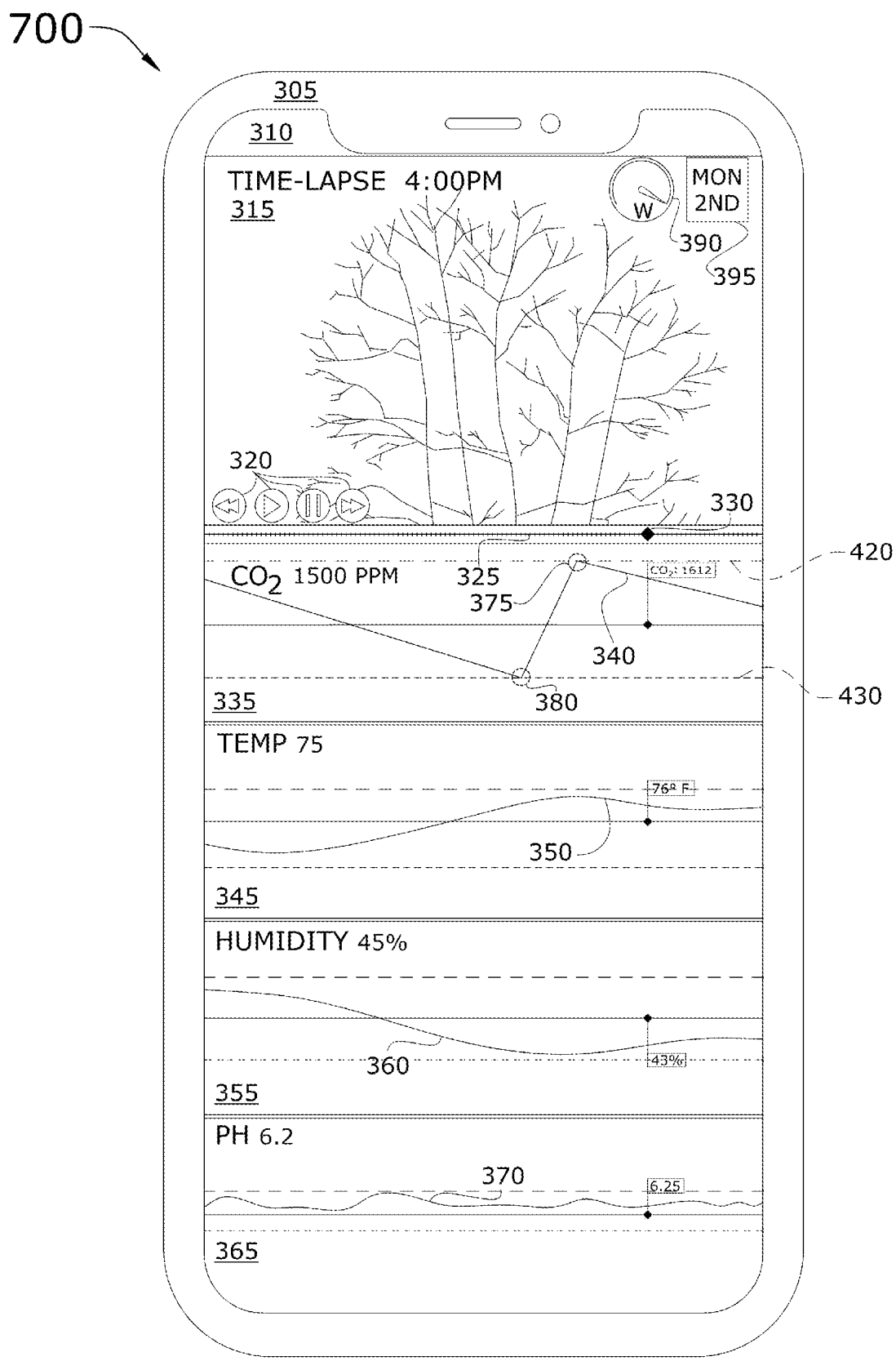
FIG. 7 conceptually illustrates a mobile device displaying a third view configuration of the horticulture time lapse user interface which combines the first view configuration with peak/high and trough/low lines shown in the second view configuration in some embodiments.

Specifically, FIG. 7 conceptually illustrates a third view configuration 700 of the horticulture time lapse user interface which combines the first view configuration, described above by reference to FIG. 3, with peak/high lines 420 and trough/low lines 430 from the second view configuration, described above by reference to FIG. 4.

The above-described embodiments of the invention are presented for purposes of illustration and not of limitation. Also, many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
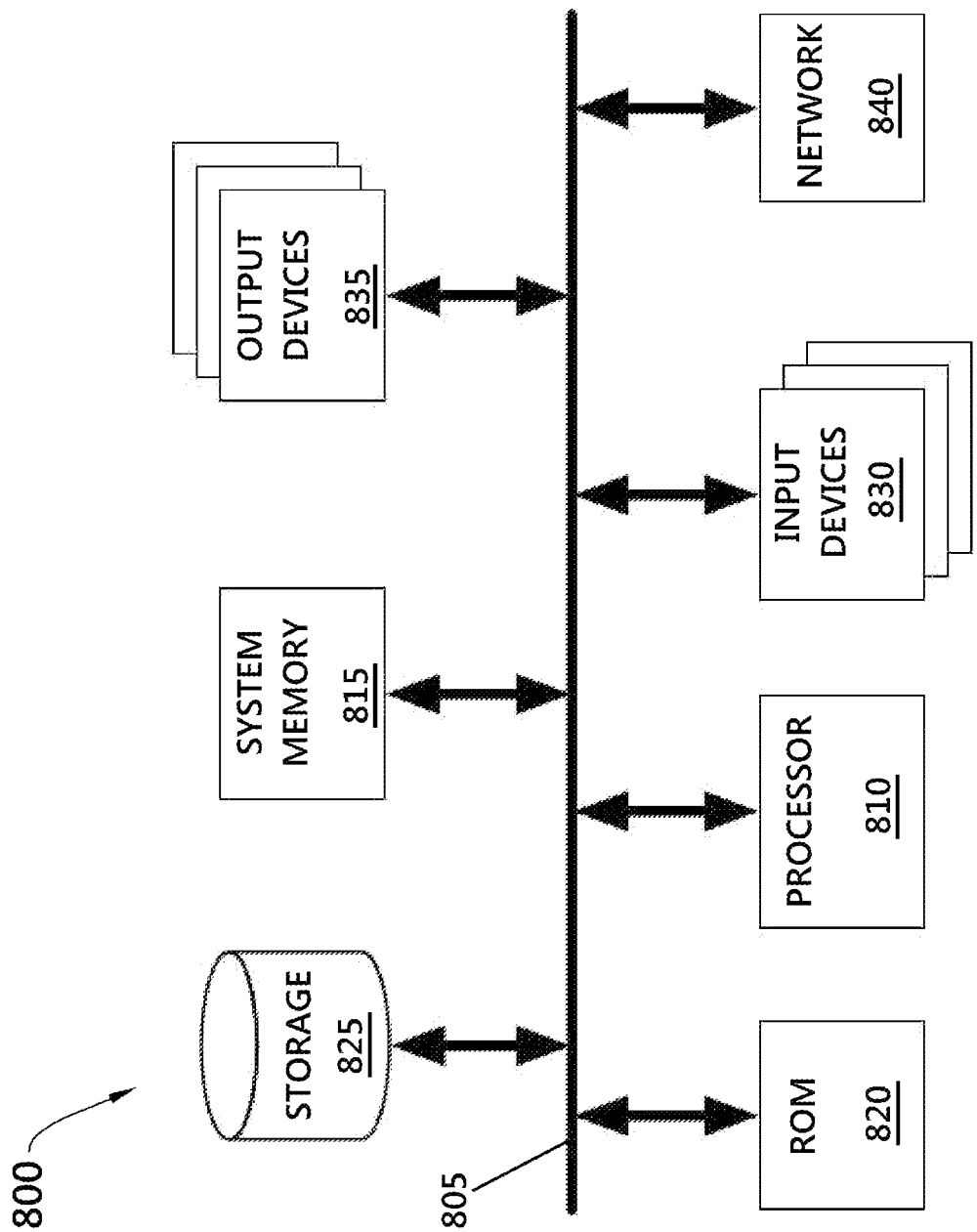
FIG. 8 illustrates an electronic system with which some embodiments of the invention are implemented.

FIG. 8 conceptually illustrates an electronic system 800 with which some embodiments of the invention are implemented. The electronic system 800 may be a cloud application server, a mobile smart device, or a conventional computer, such as a desktop or laptop computer, or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system 800. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only memory 820. From these memory units, the processing unit(s) 810 retrieves instructions to execute and data to process in order to execute the mobile application in some embodiments.

The bus 805 also connects to the input and output devices 830 and 835. The input devices enable the user to communicate information and select commands to the electronic system. The input devices 830 include alphanumeric keyboards, pointing devices (also called "cursor control devices"), physical buttons (such as the directional buttons 580 and the selection and settings buttons 590 on the front face of the power control box with built-in regulator 135), audio input devices (such as microphones), visual input devices (e.g., the time-lapse camera 105), etc. The output devices 835 display images and information generated by the electronic system 800, such as the charts and graphs associated with the atmospheric conditions of the grow environment and/or the display of information associated with the power control box with built-in regulator 135, while also outputting the videos for the time-lapse photography, and may also output audio information via speaker, or otherwise output information in other formats. The output devices 835 include display devices, such the screen of a mobile device typically as liquid crystal displays (LCD) or organic light emitting diode (OLED) displays. However, other conventional output devices are also anticipated as supporting the inventive embodiments described above, such as printers or other. Some embodiments include devices such as a touchscreen that functions as both input and output devices.

Finally, as shown in FIG. 8, bus 805 also couples electronic system 800 to a network 840 through a network adapter (not shown, but referred to as WiFi access, WiFi signal, etc., but not limited to only wireless network connections). In this manner, the computer can be a part of a network of computers (such as a local area network ("LAN"), a wide area network ("WAN"), or an intranet), or a network of networks (such as the Internet). In this way, electronic system 800 and any/all connected components, sensors, probes, or other devices may connect to the cloud application service to provide the remote monitoring and control aspect or otherwise be used with the invention.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A horticulture time lapse camera photo and sensor data capture system configured to monitor and automatically maintain a growing environment, said horticulture time lapse camera photo and sensor data capture system comprising:

a time-lapse camera that is configured to capture time-lapse photography of a plant in the growing environment, wherein the time-lapse camera comprises a camera lens that is configured to focus the time-lapse camera according to a time-lapse camera focus setting, wherein the time-lapse camera focus setting focuses the time-lapse camera on the plant within a field of view visible through the camera lens, wherein the time-lapse camera focus setting comprises one of an automatic focus setting and a manual focus setting, wherein the time-lapse camera is configured to override the time-lapse camera focus setting by remote focal control of the camera lens;

a thermometer that is configured to measure temperature in the growing environment;

a temperature control device that is configured to provide one of heat and cooling to adjust temperature in the growing environment;

a humidity sensor that is configured to measure a level of humidity in the growing environment;

a humidity control device that is configured to automatically adjust the level of humidity when the measured level of humidity is beyond a threshold humidity level;

a carbon dioxide ($CO_2$) sensor that is configured to measure a level of $CO_2$ in the growing environment;

a $CO_2$ tank and dispenser that is configured to automatically dispense carbon dioxide based on the level of $CO_2$ in the growing environment;

a soil PH probe that is configured to measure an acidity level of soil in which the plant is potted in the growing environment;

a power control box comprising a built-in regulator, a power control box display screen that is configured to display sensor data and a plurality of settings, a plurality of directional buttons for navigation of the plurality of settings displayed on the power control box display screen, and a plurality of selection and settings buttons for selecting and setting one or more particular setting in the plurality of settings, and a plurality of power outlets from which a plurality of connected components comprising the time-lapse camera, the temperature control device, the humidity control device, and the $CO_2$ tank and dispenser obtain power to operate, wherein the power control box is configured to track wattage usage of each connected component, wherein the plurality of settings displayed on the power control box display screen comprises a plurality of sensor threshold settings and a plurality of view configuration settings, wherein the plurality of sensor threshold settings comprises a threshold temperature, a threshold humidity level, and a threshold level of $CO_2$, wherein the power control box is further configured to (i) automatically trigger the temperature control device to adjust temperature in the growing environment when the temperature measurement of the thermometer is beyond the threshold temperature, (ii) automatically trigger the humidity control device to adjust the level of humidity in the growing environment when the measured level of humidity is beyond the threshold humidity level, and (iii) automatically dispense carbon dioxide when the level of $CO_2$ measured in the growing environment by the $CO_2$ sensor is less than the threshold level of $CO_2$ in the growing environment;

a wireless communication device that is communicably connected to the power control box and powered by the power control box by connection to one of the power outlets, wherein the wireless communication device is configured to provide wireless WiFi access to a network and an external storage device that is configured to store sensor data from the thermometer, the humidity sensor, the CO2 sensor, and the soil PH probe; and a mobile application that is configured to enable a user to remotely (i) connect over the network to the power control box through the wireless communication device, (ii) control focus of the time-lapse camera by user interactions in the mobile application that manipulate a focal ring of the camera lens to remotely override the time-lapse camera focus setting and re-focus the time-lapse camera with the field of view visible through the camera lens, and (iii) monitor the growing environment by visually outputting the time-lapse photography of the plant and the growing environment within the field of view for playback by the user and time-synchronized atmospheric conditions within the growing environment over a period of time spanning the time-lapse photography and based on data captured by the sensors and probes, wherein the mobile application is further configured to visually output a timeline over the period of time spanning the time-lapse photography, wherein the mobile application is further configured to visually output some of the sensor data along the timeline based on a single view configuration selection of a single view configuration setting in the plurality of view configuration settings, wherein a plurality of view configuration selections of all view configuration settings in the plurality of view configuration settings triggers the mobile application to visually output all of the sensor data along the timeline including the sensor data from the thermometer, the sensor data from the humidity sensor, the sensor data from the $CO_2$ sensor, and the sensor data from the soil PH probe.

2. The horticulture time lapse camera photo and sensor data capture system of claim 1, wherein the temperature control device comprises an air conditioner.

3. The horticulture time lapse camera photo and sensor data capture system of claim 1, wherein the temperature control device comprises a heater fan.

4. The horticulture time lapse camera photo and sensor data capture system of claim 1, wherein the $CO_2$ tank and dispenser dispenses carbon dioxide through a carbon dioxide tube.

5. The horticulture time lapse camera photo and sensor data capture system of claim 4, wherein the dispensed carbon dioxide is disbursed by an oscillating fan.

6. The horticulture time lapse camera photo and sensor data capture system of claim 1 further comprising a camera mount to which the time-lapse camera is mounted.

7. The horticulture time lapse camera photo and sensor data capture system of claim 1, wherein the humidity control device comprises a dehumidifier.

8. The horticulture time lapse camera photo and sensor data capture system of claim 1, wherein the humidity control device comprises a humidifier.

9. The horticulture time lapse camera photo and sensor data capture system of claim 1, wherein the time-lapse camera is further configured to capture security videos.

10. The horticulture time lapse camera photo and sensor data capture system of claim 1, wherein the camera lens is configured to focus the time-lapse camera based on a camera focal setting that is set to the time-lapse camera focus setting, wherein the time-lapse camera focus setting is a particular focus setting in a plurality of focus settings comprising at least the automatic focus setting and the manual focus setting.

11. The horticulture time lapse camera photo and sensor data capture system of claim 10, wherein the camera lens is configured to automatically focus the time-lapse camera when the camera focal setting is set to the automatic focus setting, wherein the time-lapse camera automatically manipulates the focal ring of the camera lens to re-focus the field of view when a remote focal control operation is specified in the mobile application and sent over the network to the time-lapse camera by way of the wireless communication device that is communicably connected to the power control box, wherein the remote focal control operation temporarily overrides the automatic focus setting to a remote-controlled focus setting for the re-focused field of view, wherein the mobile application visually outputs video of the growing environment in the re-focused field of view for the user to view, wherein the camera focal setting automatically reverts back to the automatic focus setting after the user closes the mobile application.

12. The horticulture time lapse camera photo and sensor data capture system of claim 10, wherein the camera lens is configured for manual focus of the time-lapse camera when the time-lapse camera focus setting is set to the manual focus setting, wherein the time-lapse camera automatically manipulates the focal ring of the camera lens to re-focus the field of view when a remote focal control operation is specified in the mobile application and sent over the network to the time-lapse camera by way of the wireless communication device that is communicably connected to the power control box, wherein the remote focal control operation overrides the manual focus setting and resets the manual focus setting to a second manual focus setting for the re-focused field of view.

13. The horticulture time lapse camera photo and sensor data capture system of claim 1, wherein the mobile application runs on a mobile smart device operable by the user.

14. The horticulture time lapse camera photo and sensor data capture system of claim 13, wherein the mobile smart device connects to the network via WiFi access.

15. The horticulture time lapse camera photo and sensor data capture system of claim 14, wherein the time-lapse photography comprises a video stream of the growing environment, wherein the power control box is configured to (i) receive all of the sensor data from the thermometer, the humidity sensor, the CO2 sensor, and the soil PH probe, (ii) receive the video stream of the growing environment captured by the time-lapse camera, and (iii) transmit all of the sensor data and the video stream captured by the time-lapse camera to the external storage device via the wireless communication device, wherein the external storage device comprises a cloud database of a cloud application service accessible to the power control box over the network, wherein the transmission of the video stream to the external storage device further comprises pass-through transmission to the mobile application over the connection established by the wireless communication device, wherein the mobile smart device is configured to receive the pass-through transmission of the video stream and visually output the video stream in the mobile application when the user is remotely viewing the growing environment via the mobile application, wherein the mobile application is further configured to receive any interactions by the user to remotely control power settings for the components connected to the power control box when the user is operating the mobile smart device at a location that is remote from a location of the power control box.

\* \* \* \* \*